United States Patent

[11] 3,619,554

[72] Inventors Wolfram Kiebl
 Isernhagen;
 Heinrich Schrieber, Leeste Ueber Bremen, both of Germany
[21] Appl. No. 4,355
[22] Filed Jan. 20, 1970
[45] Patented Nov. 9, 1971
[73] Assignee Kabel-und Metallwerke
 Gulehoffnungshutte Aktiengesellschaft
 Hannover, Germany

[54] DC ARC WELDING CURRENT CONTROL RESPONSIVE TO CURRENT AND WORKPIECE FEED RATE
 1 Claim, 2 Drawing Figs.
[52] U.S. Cl. .................................................. 219/131 WR,
 219/60 R, 219/61
[51] Int. Cl. ........................................................ B23k 9/10
[50] Field of Search ........................................ 219/131,
 135, 59, 60, 61; 314/62, 69

[56] References Cited
 UNITED STATES PATENTS
 1,967,198  7/1934  Caputo .......................... 219/59
 2,464,402  3/1949  Kentis, Jr. ....................... 219/135
 3,145,285  8/1964  Kohler ........................... 219/59
 3,233,076  2/1966  Vilkas ........................... 219/131
 3,243,566  3/1966  Sim et al. ....................... 219/60
 3,261,960  7/1966  Lehnert .......................... 219/131 X
 3,286,074  11/1966 Lehnert et al. ................. 219/131
 3,346,712  8/1967  Seyfried ......................... 219/60 X Primary Examiner—J. V. Truhe
Assistant Examiner—George A. Montanye
Attorney—Smyth, Roston & Pavitt ABSTRACT: A feedback control system for DC arc welding wherein signals representative of current, and workpiece feed rate, are combined to control the current supplied through a thyristor rectifier, from a leakage reactance transformer providing a smoothed AC output current, to provide fast response current control.

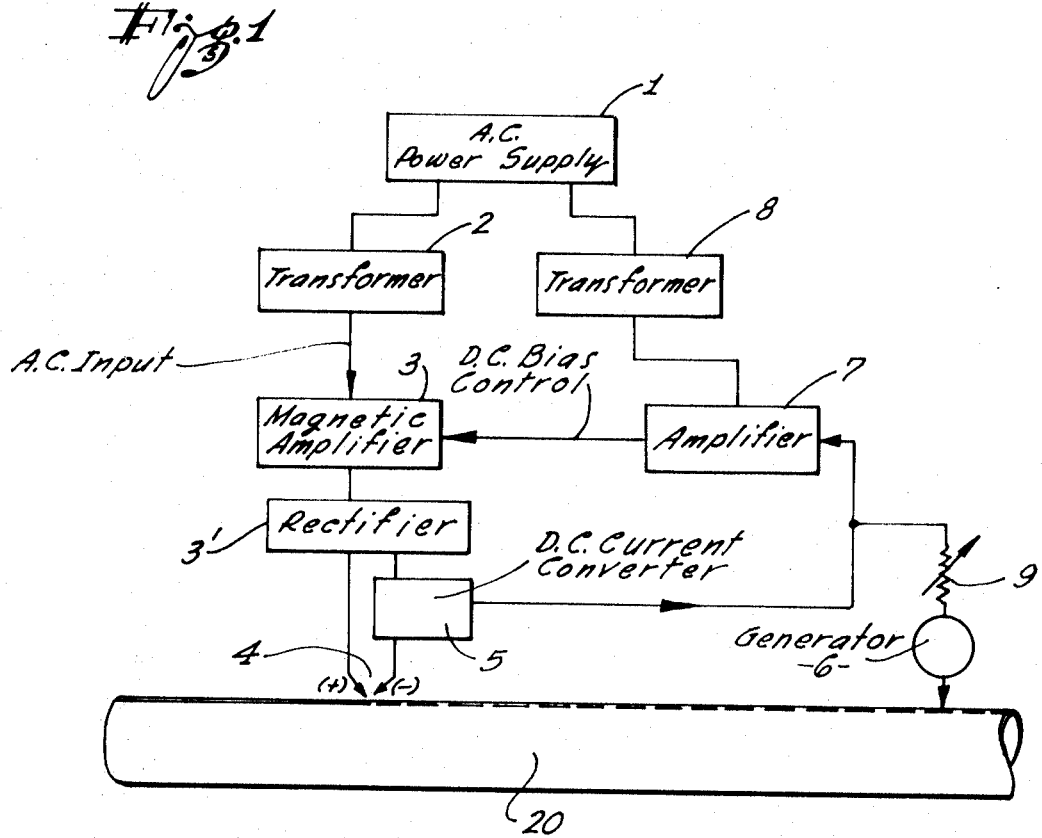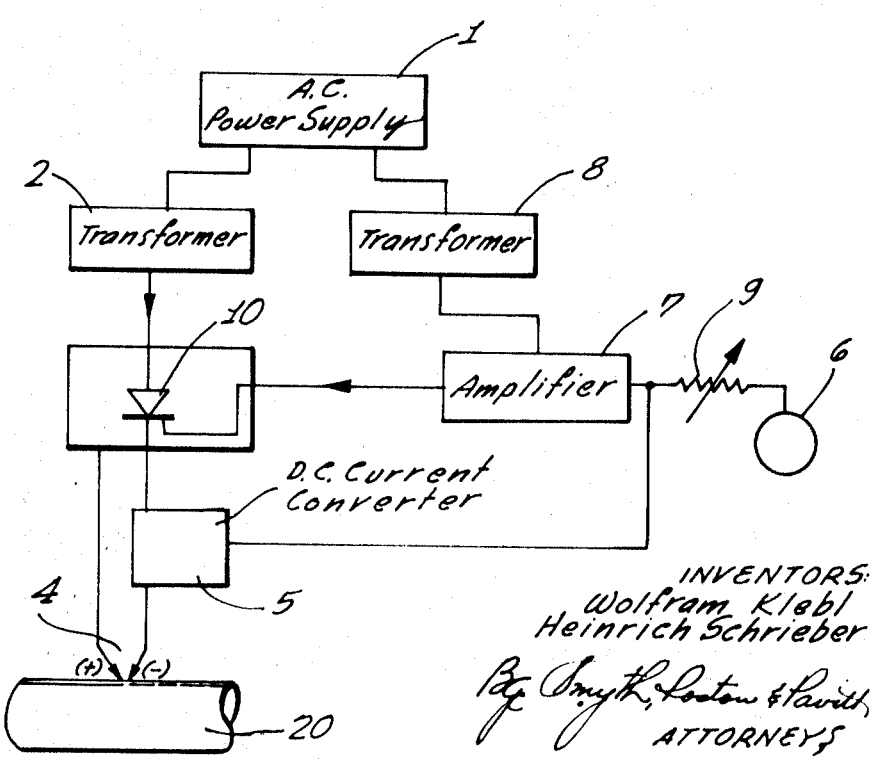

DC ARC WELDING CURRENT CONTROL RESPONSIVE TO CURRENT AND WORKPIECE FEED RATE

The present invention relates to equipment for DC arc welding of thin sheets passing under a stationary welding head, and more particularly to electric circuit arrangement for automatically welding such thin sheets. The preferred embodiment of the invention related in particular to a device to be employed for longitudinal seam welding of sheets which have been bent to form welded cylinder and adjoining edges, e.g., are welding in a protective gas, to produce a tube. The electrodes of the weldhead are supplied with current from a suitable source via a transformer, and a rectifier, connected in a circuit which includes means for adjusting the welding current.

A circuit arrangement has become known through U.S. Letters Pat. No. 3,261,960, and German Pat. No. 1,146,992, in which saturable cores with DC bias are provided as control device for the welding current. A tachometer generator is provided to furnish a signal representing the speed of the sheet as passing the welding station. The tachometer generator is coupled to the sheets to be welded or to the transporting means for these sheets.

The field circuit of this tachometer is provided with an adjustable voltage divider for establishing a basic control value for the welding current which has been selected and previously determined in accordance with the properties of the material to be welded. The armature circuit of that tachometer generator includes a trimmable resistor for adjustment of the proportionality factor of the slope of the welding current characteristics (vs. workpiece speed); that slope is to be basically determined by the type of workpieces to be welded. The control elements, i.e., the DC bias of the saturable cores is controlled by the output of the tachometer generator. Thus, the welding current is merely controlled in dependence upon the speed with which the sheets pass the welding electrodes so that during welding there is a fixed relationship between the advancing speed of the workpieces to be welded and the welding current adjustment, because the slope of the output voltage of the tachometer generator is predetermined as aforedescribed by adjustment of resistors in accordance with the characteristics and properties of the material to be welded.

This known device then operates in a manner that one type of disturbance, namely, speed variations, of the workpieces from a particular speed are compensated by changing the welding current directly in particular proportion thereto. Such a system is to some extent equivalent to a device operating, e.g., with controlled constant speed and, independently therefrom, with preadjusted constant welding current. However, this approach neglects that there are other disturbances. For example, the supply voltage, or the electrode distance or both, may change and the welding current will change accordingly so that an incompletely welded through seam may result. Such seams, of course, when subject to tension, may break. Also, it has to be observed that there may be certain irregularities in the workpieces. Adjustment of the control of the welding current, as described, can consider only average dimensions and properties but not deviations therefrom. Moreover, there may be temperature variations. Thus, there are a variety of disturbances and workpiece speed deviation is only one thereof.

The invention now solves the problem of providing equipment for automatic DC arc welding by means of which it can be guaranteed that the voltage between the electrodes in the welding head always have value so that the welding current meets at any instant the requirements for obtaining a completely welded through seam. In particular then, the invention is concerned with ascertaining the influence all of these disturbances may have on the welding process, so that a completely welded through seam may result, even though there are workpiece speed variations, supply voltage variations, electrode distance variations, and temperature variations. In accordance with the invention, it is suggested to ascertain the value of the actual welding current at any instant and to provide a value representing the actual workpiece speed. A signal representing the welding current is now referenced against a signal representing workpiece speed and the difference is used to control the welding current. This way the welding current is adjusted automatically by combining feedback control of welding current to eliminate the cause of incomplete welding due to supply voltage, electrode distance and temperature changes, with disturbance variable feed forward control to eliminate speed variations, using that latter control to establish the desired or reference value for the feedback system.

In other words, the welding current is controlled in accordance with workpiece speed, supply voltage, electrode distance and temperature, whereby speed variable, feed forward control is provided for establishing the desired value in an automatic feedback system for welding current control, which in turn indirectly eliminates variations in the welding operation due to supply voltage, electrode in the three latter factors, distance and temperature variations.

The invention has the particular advantage that in deviation from the previously known circuits, there is provided for the first time, a control circuit for automatic DC arc welding in which even minute deviations of the welding current from the value required for complete welding through are immediately compensated. The control can be provided to operate sufficiently fast so that variations in workpiece speed, supply voltage, electrode distance and temperature do not detrimentally influence the welding current, but the welding current magnitude has always that value which is required for providing a uniformly complete welding seam along the workpiece.

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawing in which:

FIG. 1 illustrates somewhat schematically a block diagram of one example for the preferred embodiment of the present invention; and FIG. 2 illustrates a block diagram of a second example of the preferred embodiment of the present invention.

Proceeding now to the detailed description of the drawings, in FIG. 1 thereof, there is illustrated a power supply source 1 which may, for example, be the mains providing 50 Hz. or 60 Hz., as the case may be. A transformer 2 is connected to source 1 and the secondary circuit of the transformer is directly connected to and includes the AC windings of a transductor or magnetic amplifier 3. The magnetic amplifier 3 is connected to or includes rectifier elements 31. Welding electrodes 4 are connected to rectifier 31; they are, in addition, symbolically represented by (+) and (−).

Electrodes 4 pertain to the welding head under which a tubular bent sheet 20 is to be welded along adjoining edges may pass. The tubular bent sheet advances by operation of suitable transportation means which are conventional and do not have to be described. A DC converter 5 as is used for measuring DC current is connected between the electrodes and rectifier 31. The secondary or output circuit of this instrument 5 provides an output current which is a faithful replica of the actual welding current at any instant.

A tachometer generator 6 is coupled to sheets 20 to be welded onto the advancing mechanism for the sheets, to provide an output voltage which represents the speed with which the sheets to be welded pass under the electrodes. The output of tachometer generator 6 provides a representation of a desired or value for determining the amplitude or magnitude of the welding current in accordance with the speed of the sheet material to be welded.

An adjustable resistor potentiometer 9 is connected to the output of tachometer 6 so that the different reference values or desired values for the welding current can be provided for a given speed. In other words, the potentiometer 9 permits selection of different relationships between welding current and sheet speed.

The reference or desired value and the actual value of the welding current as respectively represented by the outputs of the current measuring device 5 and of generator 6 (via potentiometer 9) are compared with each other; they are, in effect, superimposed and fed to the controller 7 which will normally be a regulator amplifier. Amplifier 7 should be an electronic amplifier to obtain fast response; preferably it is a transistor amplifier with a high gain. This control operation is selected so that within the feedback circuit as a whole it operates as proportional plus reset action controller. Control amplifier 7 determines the DC bias, i.e., the premagnetization of the cores of magnetic amplifier 3. Should the actual welding current as represented by the output of instrument 5 deviate from the reference value as represented by the output of generator 6, then the premagnetization of magnetic amplifier 3 is changed by operation of fast response of controller 7 to that deviation. The controller 7 is supplied with power, also from the mains but separately, through a transformer 8.

The device, in accordance with the example of the invention shown in FIG. 1, operates as follows:

After the welding machine has been turned on, transductor 3 is biased magnetically in accordance with a set value provided by controller 7 at that time. This initial prebias has been preestablished in accordance with the particular characteristics of the material, i.e., of the sheet metal to be welded. For example, the potentiometer 9 has been adjusted accordingly. The system will obtain immediately equilibrium as the response of the elements is relatively fast particularly in relation to the advance of the sheet. The welding current permitted to flow at the existing DC bias for the magnetic amplifier will be determined by the setting of potentiometer 9 for the particular sheet speed. Balanced conditions prevail at the regulator input, as the replica of the welding current supplied by device 5 is combined with the output of devices 6 and 9 as input for regulator 7.

Should now, during operation, the distance of the welding electrodes increase for reasons of any unforeseeable circumstance, a larger current, i.e., a larger driving voltage between the electrodes, is required as the welding current tends to drop. Accordingly, the output of current metering device 5 which represents the actual welding current, decreases. The input for controller 7 as now determined by the resulting difference between desired value and measured actual value for the welding current, is processed as information in controller 7 so that the premagnetization of transductor 3 is reduced, and accordingly, a larger welding current will flow through the electrodes 4. In a similar way, variations in the supply voltage from source 1 via transformer 2 can be compensated as such voltage variations are immediately accompanied by variations in the welding current, and these variations in the welding current, detected by device 5, are reflected into the controller 7, so that also in this case, controller 7 changes the premagnetization of the cores in magnetic amplifier 3. Also, if there are changes in temperature in the system which could cause variation in the welding current, such variations are rapidly compensated by operation of the circuit in accordance to the invention. Therefore, the circuit, as illustrated and designed in accordance with the principles of the invention, guarantees that the welding current provided to and flowing through electrodes 4 has value as determined at any instant by speed responsive device 6, as that device sets the overall requirement, whereby the reset action feature of the controller 7 permits introduction of variations in the welding current as may be dictated by the feedback operation responding indirectly to changes in temperature, supply voltage and electrode distance for obtaining a completely welded through welding seam.

Turning now to the circuit shown in FIG. 2, elements of similar function, possibly even of similar design and structure, have the same reference numerals as those shown in FIG. 1. There is, however, this difference that the circuit shown in FIG. 2 does not have a magnetic amplifier, but instead, the welding current adjusting elements includes thyristors. For reasons of simplifying the illustration, only a single thyristor 10 is shown, but, of course, there are as many as needed, particularly because the thyristors include function of supply current rectifying. For explaining the principle aspects and features of the invention, it suffices to explain operation in relation to a single thyristor as illustrated.

The control electrode of thyristor 10 (and of the others in the system) is connected to the output of controller amplifier 7. As far as overall operation is concerned the circuit shown in FIG. 2 functions similar to the circuit shown in FIG. 1. However, the employment of an electronic switching element, such as a thyristor, improves the response time of, particularly as far as load current control is concerned, to enhance speed of control operation. A thyristor response is faster than a response of a magnetic amplifier.

A thyristor usually extinguishes with each zero crossing and polarity change of the supply AC voltage and as supplied to its main electrodes. Thus, the thyristor has to be fired subsequently anew, i.e., after the beginning of each half-wave of polarity permitting conduction. This firing is provided particularly by the controller 7 which now operates as a phase shifter, advancing or retarding the time of firing thyristor 10 in accordance with the requirements which are set by the input to controller 7, so that accordingly, more or less current is supplied to and passes through electrodes 4.

The circuits shown in these examples and established in accordance with the features of the invention, have the additional advantage over previously known welding circuits that a particular starting circuit is not required for commencing operation. Initially, when the sheet metal is at rest, tachometer 6 provides zero output, i.e., the reference or desired value for the welding current is zero. For zero welding current the output of device 5 is likewise zero, so that balanced conditions prevail at the input of regulator 7. The welding current is throttled by adjusting device 3 or 10 to a complete off condition, as the automatic feedback control circuit actually maintains that state stably. As was mentioned above, the device 7 operates as proportional plus reset action controller, so that it can provide different outputs for balanced inputs, to maintain the required stable conditions in the system, for different desired values.

As the sheet metal begins to move, first a small and then an increasing reference value is established by the tachometer 6. Accordingly, the circuit signals a demand for welding current which increases accordingly by follower control action. The welding current, therefore, is being adjusted by the control circuit on a continuous basis, exactly in accordance with the increasing speed of the sheet, provided this speed increase is not faster than the response of the control loop. However, the proportionate action at high gain is instrumental in obtaining faithful follower action. A very definite beginning of welding can be defined, and the welding current in particular is turned on at a rather smooth slope and maintained thereafter at a new level by the reset action of controller 7. Deviations are regulated out of the system as aforedescribed.

In accordance with another feature which can be considered as being incorporated in either example as explained above, the supply transformer 2 should be provided as a leakage reactance transformer. Such transformers have the advantage that they react rather "softly" to rapid current changes in their respective secondary circuits. Therefore, steep current changes are more or less eliminated from the circuit as a whole. This is of particular importance for the circuit shown in FIG. 2. Whenever a thyristor is turned on, there is the tendency for a steep current increase in the secondary transformer circuit, but a leakage reactance transformer provides smoothing-out of that current as now actually fed as welding current to the welding electrodes.

The invention is not limited to the embodiments described above but all changes and modifications thereof not constituting departures from the spirit and scope of the invention are intended to be included.

We claim:

1. In an automatic welding apparatus for DC arc welding of thin sheets in progressive welding areas as passing a welding head at a rate of progression, the head having electrodes connected to rectifying elements which are also connected to a transformer which, in turn, is connected to a source of voltage and current supply, the apparatus further including a signal generator connected for providing a first output signal representing the rate of progression of the sheets to be welded past the welding head and defining representation of desired welding current as dependent upon the rate of progression, and signal means connected to be responsive to the actual welding current and providing a second output signal representative thereof, the improvement comprising:

the transformer constructed as a leakage reactance transformer connected to receive a supply voltage; the rectifier elements including thyristor means connected to the leakage reactance transformer and to the welding electrodes for providing a rectified welding current thereto and derived as smoothed AC from the transformer; and circuit means connected to the signal generator and to the signal means to continue the first and second output signals as respectively received therefrom, to provide firing signals for the thyristor means in response thereto to obtain adjustment of the actual welding current and to eliminate deviations of the actual welding current from the desired welding current as resulting from variations in the supply voltage, electrode distance and temperature in the welding areas of the thin sheets as progressing past the head.

* * * * *